United States Patent
Lueders et al.

(10) Patent No.: US 7,603,846 B2
(45) Date of Patent: Oct. 20, 2009

(54) METHOD FOR OPERATING AN INTERNAL COMBUSTION ENGINE AND A DEVICE FOR CARRYING OUT THE METHOD

(75) Inventors: Hartmut Lueders, Oberstenfeld (DE); Christian Walz, Durmersheim (DE); Thorsten Mayer, Worms (DE); Matthias Loehr, Steinheim/Hoepfigheim (DE)

(73) Assignee: Ronert Bosch GmbH, Stuttgart (DE)

( * ) Notice: Subject to any disclaimer, the term of this patent is extended or adjusted under 35 U.S.C. 154(b) by 273 days.

(21) Appl. No.: 11/236,162

(22) Filed: Sep. 26, 2005

(65) Prior Publication Data

US 2006/0096278 A1 May 11, 2006

(30) Foreign Application Priority Data

Sep. 25, 2004 (DE) .................. 10 2004 046 640

(51) Int. Cl.
*F01N 3/00* (2006.01)
(52) U.S. Cl. .............................. 60/277; 60/274; 60/276; 60/286; 60/301
(58) Field of Classification Search .................. 60/275, 60/276, 278, 285, 286, 295, 297, 299, 274, 60/277, 301, 303
See application file for complete search history.

(56) References Cited

U.S. PATENT DOCUMENTS

| | | | | |
|---|---|---|---|---|
| 4,751,054 | A * | 6/1988 | Watanabe | 422/111 |
| 6,134,883 | A | 10/2000 | Kato et al. | |
| 6,269,633 | B1 | 8/2001 | van Nieuwstadt et al. | |
| 6,305,160 | B1 * | 10/2001 | Hammerle et al. | 60/274 |
| 6,415,602 | B1 * | 7/2002 | Patchett et al. | 60/286 |
| 6,532,736 | B2 * | 3/2003 | Hammerle et al. | 60/286 |
| 6,546,720 | B2 * | 4/2003 | van Nieuwstadt | 60/286 |
| 6,742,330 | B2 * | 6/2004 | Genderen | 60/286 |
| 6,823,663 | B2 * | 11/2004 | Hammerle et al. | 60/286 |
| 6,928,359 | B2 * | 8/2005 | Xu et al. | 701/102 |
| 6,993,900 | B2 * | 2/2006 | Upadhyay et al. | 60/286 |
| 6,996,975 | B2 * | 2/2006 | Radhamohan et al. | 60/286 |
| 7,093,427 | B2 * | 8/2006 | van Nieuwstadt et al. | 60/286 |
| 2004/0040287 | A1 * | 3/2004 | Beutel et al. | 60/285 |
| 2004/0098968 | A1 | 5/2004 | van Nieuwstadt et al. | |
| 2005/0282285 | A1 * | 12/2005 | Radhamohan et al. | 436/55 |
| 2006/0254258 | A1 * | 11/2006 | Blakeman et al. | 60/286 |

FOREIGN PATENT DOCUMENTS

| | | |
|---|---|---|
| DE | 197 39 848 | 3/1999 |
| DE | 199 03 439 | 8/2000 |
| EP | 1 310 653 | 5/2003 |

* cited by examiner

*Primary Examiner*—Thomas E Denion
*Assistant Examiner*—Diem Tran
(74) *Attorney, Agent, or Firm*—Kenyon & Kenyon LLP

(57) ABSTRACT

A method for operating an internal combustion engine whose exhaust area has at least one SCR catalytic converter and a device for carrying out the method are described. The SCR catalytic converter receiving the reagent supports the conversion of the raw NOx emission of the internal combustion engine. At least a measure of the NOx concentration occurring downstream from the SCR catalytic converter is calculated and this value may be used to define a metering signal for the reagent and/or a heating measure for heating the SCR catalytic converter may be initiated. According to a refinement of this arrangement, a difference between the calculated NOx concentration and the sum of the measured NOx concentration and the measured reagent concentration downstream from the SCR catalytic converter is determined, and it is possible to intervene in the determination of the metering signal depending on the difference.

11 Claims, 2 Drawing Sheets

US 7,603,846 B2

METHOD FOR OPERATING AN INTERNAL COMBUSTION ENGINE AND A DEVICE FOR CARRYING OUT THE METHOD

FIELD OF THE INVENTION

The present invention is directed to a method for operating an internal combustion engine, having at least one SCR catalytic converter in the exhaust area and a device provided for carrying out the method.

BACKGROUND INFORMATION

German Published Patent Application No. 199 03 439 describes a method and a device for operating an internal combustion engine in whose exhaust area an SCR (selective catalytic reduction) catalytic converter is provided which uses a reagent to reduce nitrogen oxides in the exhaust gas of an internal combustion engine to nitrogen. The reagent is preferably metered as a function of performance characteristics of the internal combustion engine such as the speed and the quantity of fuel injected. In addition, fuel is preferably metered based on operating parameters of the exhaust gas, such as the exhaust gas temperature or the operating temperature of the SCR catalytic converter.

For example, the reducing agent ammonia, which may be obtained from a urea-water solution, is used as the reagent. The reagent or precursors of the reagent must be metered carefully into the exhaust area. If the amount metered is too low, this results in nitrogen oxides no longer being completely decreased in the SCR catalytic converter. If the metering is too high, this results in leakage of reagent, which may result in unnecessarily high reagent consumption as well as an unpleasant odor problem, depending on the nature of the reagent. In addition, another factor to be taken into account is that ammonia is toxic.

German Published Patent Application No. 197 39 848 describes a procedure using which raw NOx emissions of an internal combustion engine may be calculated at least approximately from known performance characteristics of the engine. The starting point is an engine characteristics map, which is based on the speed and torque of the engine. In addition, corrections may also be provided, e.g., as a function of the lambda value.

German Patent Application No. 10 2004 031 624 (not a prior publication) describes a method for operating an SCR catalytic converter used for purifying the exhaust gas of an internal combustion engine; with this method, control or regulation of the reagent filling level in the SCR catalytic converter is provided at a predefined setpoint storage volume. The targeted specification of the setpoint storage volume ensures that an adequate quantity of reagent for the most thorough possible elimination of raw NOx emissions produced by the internal combustion engine is available in non-steady states of the engine while avoiding reagent leakage.

The reagent filling level of the SCR catalytic converter is determined on the basis of a catalytic converter model that takes into account the NOx mass flow entering the SCR catalytic converter, the NOx mass flow leaving the SCR catalytic converter, the catalytic converter temperature and, if necessary, the reagent leakage. The maximum possible reagent filling level of the SCR catalytic converter depends in particular on the operating temperature of the SCR catalytic converter. The maximum possible reagent filling level is highest at low operating temperatures and drops to lower values with increasing operating temperatures. The efficiency of the SCR catalytic converter depends on the reagent filling level and the catalytic activity, which is also low at low operating temperatures, passing through a maximum with an increase in operating temperature and then dropping again with a further increase in operating temperature.

SUMMARY OF THE INVENTION

An object of the present invention is to provide a method for operating an internal combustion engine in whose exhaust area an SCR catalytic converter is provided and a device for carrying out the method using which reagent leakage is prevented as much as possible.

The procedure according to the present invention for operating an internal combustion engine in the exhaust gas area of which at least one SCR catalytic converter is arranged, receiving a reagent that contributes to the conversion of NOx in the SCR catalytic converter, provides the calculation of a measure for the NOx concentration occurring downstream from the SCR catalytic converter.

In general, the reagent is metered as a function of the operating characteristics of the internal combustion engine, from which the raw NOx emission of the internal combustion engine may be inferred. In addition, at least one performance characteristic of the SCR catalytic converter, e.g., the operating temperature, is taken into account. Calculating the NOx concentration or at least a measure of the NOx concentration downstream from the SCR catalytic converter permits an increase in precision in determining the metering of reagent. A precise determination of reagent dosage minimizes reagent leakage which may occur when the maximum possible reagent filling level of the SCR catalytic converter has been reached on the one hand while on the other hand the reduction reaction is either not taking place to the required extent or cannot take place at all due to the fact that the raw NOx emission by the internal combustion engine is too low.

According to one embodiment, the NOx concentration downstream from the SCR catalytic converter is calculated from a measure of the raw NOx emission of the internal combustion engine and a measure of the efficiency of the SCR catalytic converter. The efficiency or at least a measure of the efficiency of the SCR catalytic converter is preferably determined as a function of the operating temperature of the SCR catalytic converter and the reagent filling level of the SCR catalytic converter. If necessary, at least one characteristic of the exhaust, e.g., the exhaust mass flow and/or the spatial velocity in the SCR catalytic converter may be taken into account.

According to one embodiment, for the measurement an NOx sensor having a cross sensitivity to the reagent is used. With this measure, only one sensor need be used. Such an NOx sensor is known from the related art cited in the introduction. The NOx concentration is measured indirectly based on an NOx reduction reaction and measuring the oxygen required for that. With a suitable choice of reagent, e.g., ammonia, a comparable reduction reaction occurs, so that a reagent that may be present downstream from the SCR catalytic converter will affect the measurement result in the same way as the NOx reduction reaction.

According to a refinement of this embodiment, the difference is determined between the calculated measure of the NOx concentration and the measure of the sum of the NOx concentration and the reagent concentration measured. This difference is a direct reflection of the reagent leakage or at least reflects a measure of the reagent leakage.

According to a particularly advantageous embodiment, when reagent leakage is detected, the metering of reagent or reagent precursor is decreased, and when a subsequent increase in the measure of the sum of the NOx concentration and the reagent concentration is measured, in particular with respect to the measure of the raw NOx emission of the internal combustion engine, the dosage of the reagent is increased. This embodiment takes into account the fact that both reagent leakage and inadequate NOx reduction reaction cause a deviation in the same direction between the calculated measure of the NOx concentration and the measure of the sum of NOx concentration and reagent concentration measured. If there has actually been reagent leakage, the decrease in dosage of the reagent will result in a decrease in reagent slippage. The decrease in dosage of the reagent has in this case turned out to be the correct measure and is retained. If originally the dosage of reagent was too low, then the difference thus determined will increase, so that it may be concluded that the measure of reducing the dosage of reagent was incorrect and instead the dosage is to be increased.

According to one embodiment, a change in the dosage of reagent is performed only when the difference between the calculated measure of the NOx concentration and the measure of the sum of the NOx concentration and the reagent concentration measured exceeds a specified threshold value. The threshold value preferably is a function of the calculated measure of the NOx concentration and/or the measure of the sum of the NOx concentration and the reagent concentration measured. With these measures, tolerances in dosage, calculation, and measurement are taken into account.

The device according to the present invention for performing the method according to the present invention relates at first to a control unit, which is equipped for performing the method. The control unit is equipped in particular for calculating at least one measure of the NOx concentration occurring downstream from the SCR catalytic converter.

Use of an exhaust sensor situated downstream from the SCR catalytic converter and having not only sensitivity to NOx but also cross sensitivity to ammonia is particularly advantageous, so that the sensor signal reflects a measure of at least approximately the sum of the NOx concentration and the reagent concentration.

DETAILED DESCRIPTION

Figure 1:
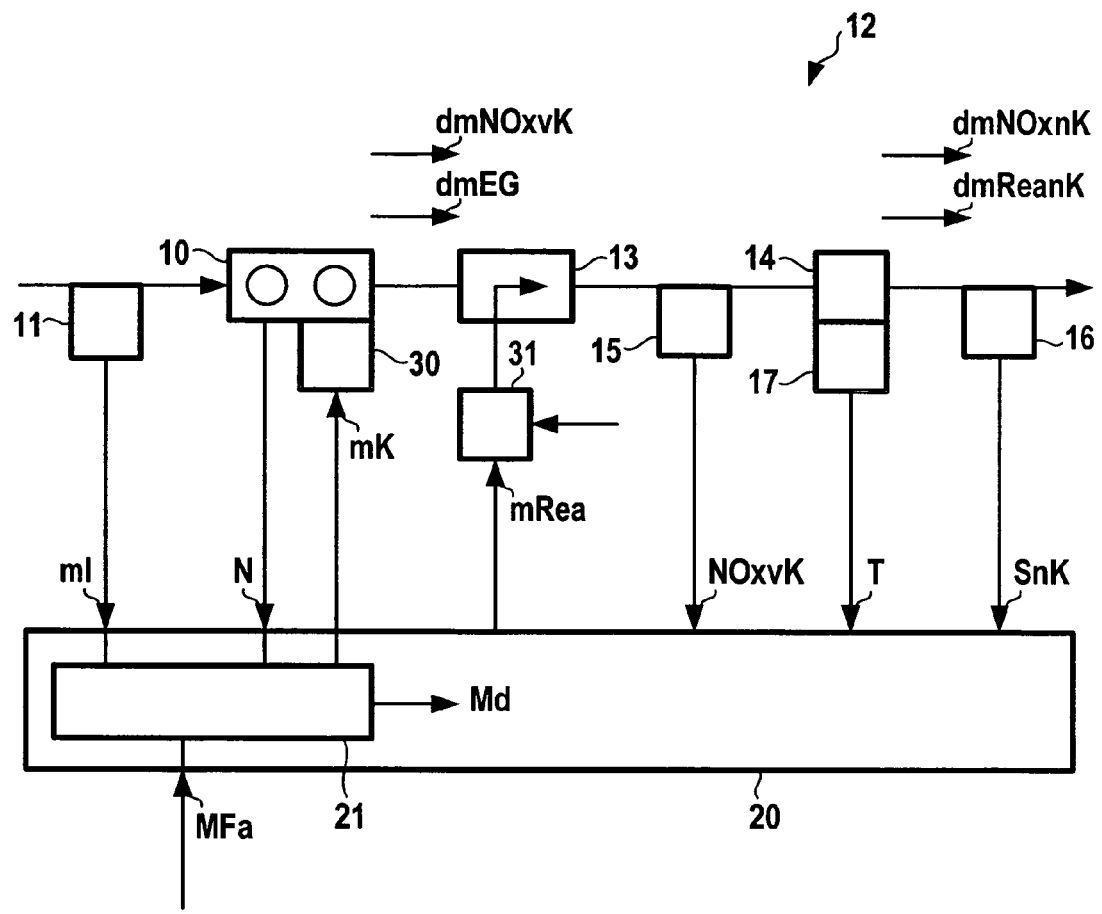
FIG. 1 shows the technical environment in which a method according to the present invention takes place.

FIG. 1 shows an internal combustion engine 10 having an air sensor 11 in the intake area and a reagent introducing device 13, as well as an SCR catalytic converter 14 in the exhaust area 12. Downstream from internal combustion engine 10 and upstream from SCR catalytic converter 14, an exhaust mass flow dmEG and raw NOx emission dmNOxvK of internal combustion engine 10 occur. An NOx concentration dmNOxvK as well as a reagent leakage dmReanK occur downstream from SCR catalytic converter 14.

A first NOx sensor 15 upstream from SCR catalytic converter 14 supplies an NOx sensor signal NOxvK and a second NOx sensor 16 downstream from SCR catalytic converter 14 supplies exhaust sensor signal SnK. A temperature sensor 17 supplying a temperature signal T is provided for SCR catalytic converter 14.

Air sensor 11 situated in the intake area supplies an air signal m1 and internal combustion engine 10 supplies a rotational speed signal N.

Air signal m1, rotational speed signal N, NOx sensor signal NOxvK, temperature signal T and exhaust sensor signal SnK are supplied to a control unit 20, which also receives a torque setpoint value MFa.

Control unit 20 has a torque determination unit 21 which determines a torque Md of internal combustion engine 10 from air signal m1, torque signal N and torque setpoint value MFa.

A fuel signal mK determined by torque determination unit 21 is delivered by the control unit to a fuel metering device 30 assigned to internal combustion engine 10. Control unit 20 also delivers a metering signal mRea to a metering valve 31 connected to reagent introducing device 13.

Figure 2:
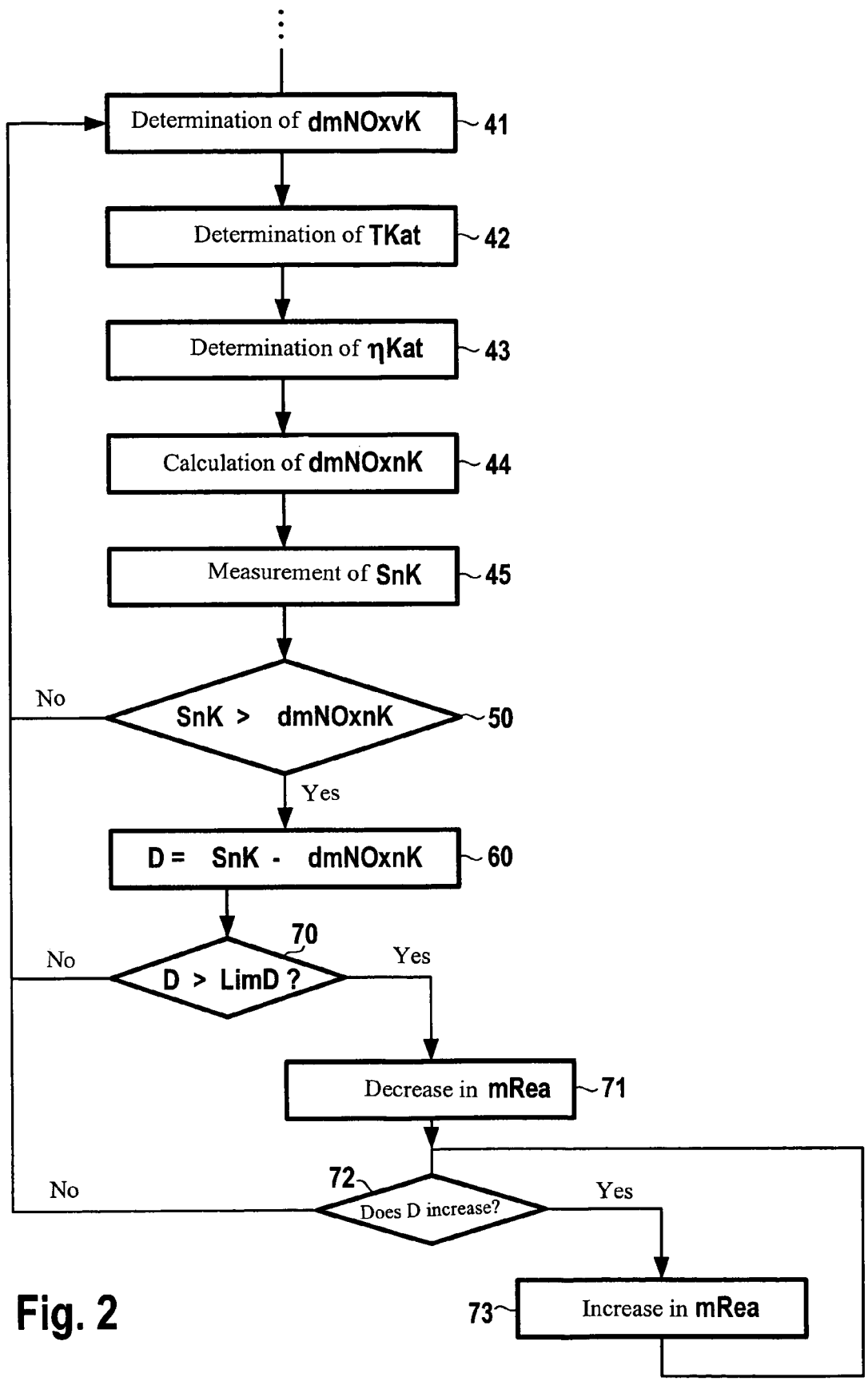
FIG. 2 shows a flow chart of a method according to the present invention.

FIG. 2 shows a flow chart which begins with a first function block 41 having a determination of raw NOx emission dmNOxvK by internal combustion engine 10. In a second function block 42, catalytic converter temperature TKat is determined and in a third function block 43 catalytic converter deficiency ηKat is determined. In a fourth function block 44, NOx concentration dmNOxnK is determined and in a fifth function block 45 exhaust sensor signal SnK of second NOx sensor 16 is detected downstream from SCR catalytic converter 14.

A first query 50 checks on whether exhaust sensor signal SnK is greater than calculated NOx concentration dmNOxnK downstream from SCR catalyst 14. If this is not the case, the sequence jumps back to first function block 41. If this is the case, the sequence jumps to a sixth function block 60 in which a difference D between exhaust sensor signal SnK and calculated NOx concentration dmNOxnK is determined.

A second query 70 downstream checks on whether difference D is greater than a specified difference threshold value LimD. If this is the case, the sequence jumps to a first allocation 71 in which metering signal mRea is decreased. If this is not the case, the sequence jumps back to first function block 41.

A third query 73 downstream checks on whether difference D has increased or decreased. If difference D increases, then in a second allocation 73, metering signal mRea is increased. If this is not the case, the sequence jumps back to first function block 41.

The method according to the present invention functions as follows:

Torque determination unit 21 situated in control unit 20 determines torque Md to be applied by internal combustion engine 10 as a function of at least specified torque setpoint value MFa, which is supplied, for example, by a gas pedal (not shown) of a motor vehicle. Torque Md is already a measure of the load on internal combustion engine 10. In determination of torque Md, rotational speed signal N and/or air signal m1 supplied by air sensor 11 may also be taken into account. Control unit 20 supplies fuel signal mK, which is in turn supplied by torque determination unit 21 to fuel metering device 30. Fuel signal mK specifies, for example, a quantity and a point in time for fuel injection.

The fuel burned in internal combustion engine 10 results in exhaust mass flow dmEG, which may contain unwanted raw NOx emission dmNOxvK, depending on the operating point of internal combustion engine 10. Raw NOx emission dmNOxvK is a function of the operating point of internal combustion engine 10, which is determined at least by torque Md. Preferably rotational speed signal N is also taken into account.

For the most extensive possible elimination of raw NOx emissions dmNOxvK, at least one SCR catalytic converter 14 is provided in exhaust area 12 of internal combustion engine 10. In addition to SCR catalytic converter 14, other catalytic converters and a particulate filter may also be provided. SCR catalytic converter 14 supports the reduction reaction of NOx with the reagent, which is either metered into exhaust area 12 by reagent introducing device 13 or, if necessary, supplied internally to the engine. Instead of the reagent, a precursor may also be provided. In the case of ammonia as the reagent, instead of ammonia as the precursor, a urea-water solution or ammonium carbamate, for example, may be provided.

The quantity of reagent, i.e., the flow of reagent, is defined at the time of introduction into exhaust area 12 by metering valve 31 which is connected to a storage container (not shown in detail). Control unit 20 defines the opening cross section of metering valve 31, for example, via metering signal mRea.

After the start of the method according to the present invention, at least one measure of raw NOx emission dmNOxvK of internal combustion engine 10 is determined in a first function block 41 either on the basis of first NOx signal NOxvK of first NOx sensor 15 or preferably on the basis of at least one engine characteristics map. First NOx sensor 15 may then be omitted. Raw NOx emission dmNOxvK is a function of the operating point of internal combustion engine 10, which may be in turn determined by torque Md alone. Instead of torque Md, fuel signal mK alone may also be used as the basis. The operating point is preferably still given as a function of the rpm of internal combustion engine 10, which is obtained from rotational speed signal N.

In second function block 42, at least a measure of catalytic converter temperature TKat is determined. For detection of temperature, temperature sensor 17 is provided, and may be situated upstream from SCR catalytic converter 14, directly on SCR catalytic converter 14 or downstream from SCR catalytic converter 14. It is essential here that temperature signal T reflects at least a measure of the operating temperature of SCR catalytic converter 14. Instead of a temperature measurement, an estimate of catalytic converter temperature TKat may also be provided.

In third function block 43, at least one measure of efficiency ηKat of SCR catalytic converter 14 is determined. Efficiency ηKat depends in particular on the operating temperature of SCR catalytic converter 14. The operating temperature of SCR catalytic converter 14 determines essentially the catalytic activity which is low at lower temperatures, e.g., below 150° C., reaching a maximum at 250° C., for example, and then declining again at higher operating temperatures.

In addition, in determining efficiency ηKat of SCR catalytic converter 14, exhaust gas mass flow dmEG, which may be determined from air signal m1 alone may be taken into account. If necessary, fuel signal mK may also be taken into account. If fuel signal mK is based on piston stroke, rotational speed signal N may also be used. A spatial velocity of the exhaust gas in SCR catalytic converter 14 may be determined from these parameters and taken into account in the determination of efficiency ηkat of SCR catalytic converter 14 instead of using exhaust gas mass flow dmEG.

These relationships are described in detail in the related art according to German Patent Application No. 10 2004 031 624 (not a prior publication). Reference is made to the full content of this document.

At least a measure of NOx concentration dmNOxnK and/or NOx mass flow and/or NOx volume flow in the exhaust gas downstream from SCR catalytic converter 14 is calculated in fourth function block 44. NOx concentration dmNOxnK downstream from SCR catalytic converter 14 is obtained from calculated raw NOx emission dmNOxvK multiplied by the term (1−efficiency ηKat of SCR catalytic converter 14).

Simply calculating NOx concentration dmNOxnK downstream from SCR catalytic converter 14 permits an influence on metering signal mRea with the goal of reducing NOx concentration dmNOxnK. At a calculated high NOx concentration dmNOxnK, for example, metering signal mRea may be increased. Taking into account temperature signal T, it is possible to decide in the case of a calculated high NOx concentration dmNOxnK, if necessary, that measures should be taken for heating SCR catalytic converter 14.

In fifth function block 45 which follows, exhaust gas sensor signal SnK is detected and analyzed if necessary. Exhaust gas sensor signal SnK is supplied by second NOx sensor 16 which is situated downstream from SCR catalytic converter 14. If first NOx sensor 15 is omitted, second NOx sensor 16 is the only NOx sensor. It is possible in principle to detect NOx concentration dmNOxnK downstream from SCR catalytic converter 14 using an NOx sensor and to detect reagent leakage dmReanK using a reagent sensor. However, it is particularly advantageous to utilize the cross sensitivity of second NOx sensor 16 with respect to the reagent.

This cross sensitivity occurs in particular when the measurement is based on the same physical processes. If ammonia is used as the reagent, then both cases involve a reduction reaction within second NOx sensor 16. Second NOx sensor signal NOxhK changes with a change in NOx concentration dmNOxnK downstream from SCR catalytic converter 14 and with a change in reagent leakage dmReanK. Therefore, exhaust sensor signal SnK of second NOx sensor 16 is not referred to as an NOx signal but instead is referred to in general as exhaust gas sensor signal SnK. The disadvantage here is that it is impossible to differentiate at first between the change in NOx concentration dmNOxnK and the change in reagent leakage dmReanK.

Reagent leakage dmReanK may occur when the reagent filling level in SCR catalytic converter 14 exceeds the maximum allowed upper limit. Reagent leakage dmReanK may also occur when there are sudden changes in load even if metering signal mRea is decreased all the way to 0 or increased to a maximum value at the same time depending on the direction of the sudden change in load.

First query 50 checks on whether exhaust gas sensor signal SnK exceeds calculated NOx concentration dmNOxnK downstream from SCR catalytic converter 14. If this is not the case, then the sequence jumps back to first function block 41, for example. If this is the case, it is first assumed that an excessively high metering of reagent has occurred, which has caused an increased reagent leakage dmReanK. In this case, the sequence first jumps to a sixth function block 60 in which the difference D between exhaust gas sensor signal SnK and calculated NOx concentration dmNOxnK is determined.

Difference D thus determined is compared in a second query 70 with a difference threshold value LimD. If difference D thus determined does not exceed difference threshold value LimD, the sequence jumps back to first function block 41, for example. If difference D thus determined exceeds difference threshold value LimD, a jump takes place back to a first allocation 71, which provides for a decrease in metering signal mRea that counteracts the increased reagent leakage.

The determination of difference D and the subsequent comparison with difference threshold value LimD ensures that there will be a response to a deviation only in the case of larger deviations. With this measure, which is provided if necessary, tolerances in determining raw NOx emission dmNOxvK, in the definition of metering signal mRea, in calculation of NOx concentration dmNOxnK and measurement errors in second NOx sensor 16 are taken into account. Raw NOx emission dmNOxvK thus determined is preferably taken into account in defining difference threshold value LimD.

In an alternative embodiments, second query 50 may be omitted and instead difference D is determined immediately according to the sixth function block.

Third query 72 checks on whether difference D is increasing. In this check, a reference to raw NOx emission dmNOxvK is preferably established again because a change in raw NOx emission dmNOxvK has effects on exhaust gas sensor signal SnK. If difference D does not increase after a decrease in metering signal mRea, then the response to difference D between calculated NOx concentration dmNOxnK and exhaust gas sensor signal SnK is in order and the sequence jumps back to first function block 41, if necessary. However, if an increase in difference D is found in third query 72, then in second allocation 73 there is an increase in metering signal mRea, resulting in an increased metering of reagent. After the increase in metering signal mRea, third query 72 is again performed.

According to one embodiment of the method according to the present invention, the method is not performed when the temperature drops below a specified temperature limit of 150° C., for example, because reagent leakage dmReanK is unlikely at low temperatures of SCR catalytic converter 14 because of its great reagent storage capacity. In addition, the method according to the present invention is not performed if the temperature of second NOx sensor 16 is not within a specified operating temperature range.

According to one embodiment, a change in metering signal mRea may be provided directly. If the control or in particular the regulation of the reagent filling level of SCR catalytic converter 14 at a preselected value is provided as described in the related art according to DE 10 2004 031 624 (not a prior publication) cited in the introduction, then metering signal mRea may be determined by increasing or decreasing the calculated reagent filling level of SCR catalytic converter 14. Another possibility is to correct a characteristics line (not shown in greater detail here) of metering valve 31. The main advantage of these measures is that no additional computation operations are necessary after a displacement of characteristics lines, so the method according to the present invention does not put any further demand on the limited resources in control unit 20.

What is claimed is:

1. A method for operating an internal combustion engine having an exhaust area in which at least one SCR catalytic converter is disposed, comprising:
   supplying the SCR catalytic converter with a reagent that contributes to an NOx conversion in the SCR catalytic converter;
   calculating, at least one measure of an NOx concentration prevailing downstream from the SCR catalytic converter; and
   determining a measure of a reagent leakage as a function of a difference between the calculated measure of the NOx concentration and a sensor-obtained measurement of a sum of the NOx concentration and a downstream reagent concentration.

2. The method as recited in claim 1, wherein a determined raw NOx emission of the internal combustion engine is taken into account in one of determining a difference and defining a difference threshold value.

3. The method as recited in claim 1, wherein the reagent leakage is determined only under specified operating conditions of at least one of an NOx sensor and the SCR catalytic converter.

4. The method as recited in claim 1, wherein the NOx concentration is calculated from at least one measure of a raw NOx emission of the internal combustion engine and at least one measure of an efficiency of the SCR catalytic converter.

5. The method as recited in claim 4, further comprising:
   calculating the efficiency of the SCR catalytic converter at least as a function of at least one measure of a temperature of the SCR catalytic converter and at least one measure of a reagent filling level of the SCR catalytic converter.

6. The method as recited in claim 1, further comprising:
   measuring downstream from the SCR catalytic converter at least one measure of at least approximately a sum of the NOx concentration and a reagent concentration.

7. The method as recited in claim 6, wherein an NOx sensor having a cross sensitivity to the reagent is used for the measurement.

8. The method as recited in claim 1, further comprising:
   if the reagent leakage is indicated by the determination, decreasing a metering of the reagent; and
   if a further increase in a sensor signal of an NOx sensor is subsequently detected, increasing the metering of the reagent.

9. The method as recited in claim 8, further comprising:
   modifying the metering of the reagent only when a determined difference exceeds a predefined difference threshold value.

10. A device for operating an internal combustion engine having an exhaust area in which at least one SCR catalytic converter is disposed, comprising:
    an arrangement adapted for supplying the SCR catalytic converter with a reagent that contributes to an NOx conversion in the SCR catalytic converter; and
    a control unit adapted for calculating at least one measure of an NOx concentration prevailing downstream from the SCR catalytic converter and determining a measure of a reagent leakage as a function of a difference between the calculated measure of the NOx concentration and a sensor-obtained measurement of a sum of the NOx concentration and a downstream reagent concentration.

11. The device as recited in claim 10, further comprising:
    an exhaust gas sensor situated downstream from the SCR catalytic converter, the exhaust gas sensor having a cross sensitivity to a reagent in addition to a sensitivity to Nox.

* * * * *